United States Patent [19]

Choudhary et al.

[11] Patent Number: 5,756,421
[45] Date of Patent: May 26, 1998

[54] COMPOSITE CATALYSTS CONTAINING TRANSITIONAL AND ALKALINE EARTH METAL OXIDES USEFUL FOR OXIDATIVE CONVERSION OF METHANE (OR NATURAL GAS) TO CARBON MONOXIDE AND HYDROGEN (OR SYNTHESIS GAS)

[75] Inventors: Vasant R. Choudhary; Amarjeet M. Rajput; Subhash D. Sansare; Bathula Prabhakar; Ajit S. Mamman, all of Maharashtra, India

[73] Assignee: Council of Scientific & Industrial Research, New Deli, India

[21] Appl. No.: 531,125

[22] Filed: Sep. 20, 1995

Related U.S. Application Data

[63] Continuation of Ser. No. 943,183, Sep. 10, 1992, abandoned.

[51] Int. Cl.$^6$ ............................................. B01J 23/58
[52] U.S. Cl. ........................... 502/328; 502/337; 502/339
[58] Field of Search .................................. 502/328, 337, 502/339

[56] References Cited

U.S. PATENT DOCUMENTS

| | | | |
|---|---|---|---|
| 3,945,944 | 3/1976 | Kang | 502/328 |
| 4,101,449 | 7/1978 | Noda et al. | 502/250 |
| 4,440,874 | 4/1984 | Thompson | 502/328 |
| 4,485,256 | 11/1984 | McKinney | 502/328 |
| 4,818,745 | 4/1989 | Kolts | 502/328 |
| 4,992,408 | 2/1991 | Jackson | 502/328 |
| 5,100,632 | 3/1992 | Dettling et al. | 502/328 |
| 5,137,863 | 8/1992 | Matsuura et al. | 502/328 |
| 5,338,488 | 8/1994 | Choudhary et al. | 502/328 |

*Primary Examiner*—Gary P. Straub
*Assistant Examiner*—Thomas G. Dunn Jr.
*Attorney, Agent, or Firm*—Ladas & Parry

[57] ABSTRACT

The invention relates to a process for the preparation of novel composite catalysts useful for the oxidative conversion of methane to synthesis gas. The catalysts are represented by the formula: $T_mAO_n$, wherein T is a transition metal or metals, m is equal to the T/A mole ratio and is from 0.01 to 100, A is an alkaline earth metal or metals, O is oxygen and n is the number of oxygen atoms needed to form a catalyst composite wherein each element of the composite has a complete set of valence electrons. The process includes mixing compounds containing the transition metal or metals in finely ground form with the compounds containing the alkaline earth metals or metals in finely ground form in a T/A mole ratio of about 0.01 to about 100, heating the mixture to dryness at a temperature of about 80° to 250° C., decomposing the dried mixture at a temperature of about 400° to 1200° C., powdering the decomposed mixture and forming catalyst pellets thus formed at a temperature of about 400° to 1500° C.

13 Claims, No Drawings

COMPOSITE CATALYSTS CONTAINING TRANSITIONAL AND ALKALINE EARTH METAL OXIDES USEFUL FOR OXIDATIVE CONVERSION OF METHANE (OR NATURAL GAS) TO CARBON MONOXIDE AND HYDROGEN (OR SYNTHESIS GAS)

This is a continuation of application Ser. No. 07/943,183 filed on Sep. 10, 1992, now abandoned.

FIELD OF THE INVENTION

This invention relates to novel composite catalysts containing transitional and alkaline earth metal oxides useful for oxidative conversion of methane (or natural gas) to carbon monoxide and hydrogen or synthesis gas. This invention particularly relates to a novel process for preparation of composite catalysts containing transitional and alkaline earth metal oxides, useful for oxidative conversion of methane (or natural gas) to carbon monoxide and hydrogen (or synthesis gas).The catalysts prepared by this invention are useful for the production of carbon monoxide and hydrogen (or synthesis gas i.e a mixture of carbon monoxide and hydrogen) from methane or natural gas. The process of the present invention could be used by catalyst manufacturers and producers of carbon monoxide, hydrogen or synthesis gas as well as their users, for examples those produce methanol and methanol based products, Fischer-Tropsch synthesis products such as liquid hycrocarbons,olefins, alcohols and aldehydes, ammonia and ammonia based fertilizers and chemicals, oxo-synthesis products, town gas, and reduction gas (for production of sponge iron), etc.

BACKGROUND OF THE INVENTION

The conversion of methane or natural gas to carbon monoxide and hydrogen (or synthesis gas) by catalytic steam reforming, autothermal catalytic reforming and non-catalytic partial oxidation is known in the prior art.

The catalytic steam reforming of methane or natural gas to synthesis gas (i.e hydrogen and carbon monoxide) is a well established techonology practiced for commercial production of hydrogen, carbon monoxide and syngas (i.e mixture of hydrogen and carbon monoxide). In this process, hydrocarbon feeds are converted to a mixture of $H_2$, CO and $CO_2$ by reacting hydrocarbons with steam over a catalyst (NiO supported on calcium aluminate, alumina, spinel type magnesium aluminium oxide or calcium aluminate titanate) at elevated temperature (850°–1000° C.) and pressure (10–40 atm) and at steam/carbon mole ratio of 2–5 and gas hourly space velocity (based on wet feed) of about 5000–8000 per hour. This process involved following reactions.

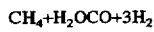

$CH_4 + H_2O \leftrightarrow CO + 3H_2$ or

$C_nH_m + nH_2O \leftrightarrow nCO + [n+(m/2)]H_2$ and

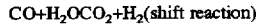

$CO + H_2O \leftrightarrow CO_2 + H_2 \text{(shift reaction)}$

The conversion is highly endothermic and is carried out in a number of parallel tubes packed with catalyst and externally heated by flue gas at a temperature of 980°–1040° C. (Kirk and Othmer, Encyclopedia of Chemical Techonology, 3rd Edn.,1990 vol. 12 p. 951 ; Ullamann's Encyopedia of Industrial Chemistry, 5th Edn., 1989 , vol.A-12 p.186). The main drawbacks of this process are as follows. It is highly endothermic and operated at high temperature. Hence, it is highly energy intensive. Further, the shift reaction occuring in the process leads to formation of $CO_2$ and $H_2$ from CO and water, thus increasing $H_2/CO$ ratio. Since lower $H_2$ ratio than that obtained by the steam reforming is required for certain applications of synthesis gas, secondary reformer using $CO_2$ or $O_2$ oxidants are frequently required to reduce the hydrogen content of synthesis gas produced by the steam reforming. Also, the supported nickel catalyst used in the steam reforming is poisoned by sulfur containing compounds present in very low concentrations in the feed hydrocarbons. Further, there is a carbon deposition on the catalyst during the steam reforming.

Autothermal catalytic reforming of methane or natural goes with air or oxygen to $H_2$, CO and $C_{O2}$ is also an established technology. In this process, a feed gas mixture containing hydrocarbon, steam and oxygen (or air) is passed through a burner and then the combustion gases are passed over a catalyst (nickel supported on alumina) in a fixed bed reactor at 850–1000 C. and 20–40 atm. (Ullamann's Encylopedia of Industrial Chemistry 5th Edn.,1989, vol. A-12, p.202). This process has following drawbacks. There are large temperature and space velocity variations during start-up and shut-down which leads to abrasion and catalyst disintegration, requiring frequent refilling and removal of the catalyst. This process operaters at high temperature and pressure and there is a formation of carbon (or carbon deposition) in the reactor.

Non-catalytic partial oxidation of hycrocarbons to $H_2$, CO and $CO_2$ is an established technology used mostly for producing hydrogen from heavy fuel oils, primarily in locations where natural gas or lighter hydrocarbons, including naphtha, are unavailable or are uneconomical as compared with fuel oil or crude oil. This process is carried out by injecting preheated hydrocarbon, oxygen and steam through a specially designed burner into a closed combustion chamber, where partial oxidation of the hydrocarbons with less than stochiometric oxygen for complete combustion occurs at very high temperature (1350°–1600° C.) and pressures upto 150 atm (Kirk and Othmer, Encyclopedia of Chemical Technology 3rd Edn., 1990, vol. 12 p. 952 ; Ullamann's Encyclopedia of Industrial Chemistry 5th Edn., 1939, vol. 12, p. 204 ). The main drawbacks of this process are as follows. This process is operated at a very high temperature and very high pressure and there is extensive soot or carbon formation, particularly from heavy hydrocarbons.

Recently, Ashcroft and co-workers (Nature, vol.344,1990, p.319) have reported selective oxidation of methane to synthesis gas (which is mildly exothermic reaction) using lanthanide ruthenium oxide ( $Ln_2Ru_2O_7$ where Ln is lanthanide or rare earth element such as Pr, Sm, Eu, Gd, Tb, Dy, Tm, Yb, Lu) catalysts at 777° C., and total gas hourly space velocity of $4 \times 10^4$ $h^{-1}$ with $CH_4/O_2$ mole ratio 2.0 and $N_2/CH_4$ mole ratio of 2.0. The catalyst were prepared by conventional solid state reactions between $Ln_2O_3$ and $RuO_2$ in a sealed silica tube. Although, high methane conversions to CO and $H_2$ have been obtained using these catalysts, the catalyst cost is exorbitantly high because of the use of extremely costly Ru in the catalyst in stochiometric quantities (i.e Ru/Ln mole ratio=1.0).

In view of limitations of the prior art processes and catalysts used for the conversion of methane (or natural gas) to synthesis gas, the main object of the present invention is to develope novel catalysts, which are highly active, highly selective and highly productive but have low cost, for the oxidative conversion of methane (or natural gas) to synthesis gas, which can be carried out at lower temperatures and higher space velocities (i.e lower contact times).

SUMMARY OF THE INVENTION

The main finding of the present invention is that highly active/selective composite catalysts, containing transitional and alkaline earth metal oxides and represented by the formula $T_mA\ O_n$ wherein T is transitional element selected from Ni, Co, Pd, Ru, Rh, Ir, or like or a mixture of two or more thereof, m (i.e T/A mole ratio) is from about 0.01 to about 100, A is alkaline earth element selected from Mg, Ca, Ba, Sr or like or a mixture of two or more thereof, O is oxygen, and n is number of oxygen atoms needed to fulfil the valence requirements of the transitional and alkaline earth elements in the catalyst,useful for oxidative conversion of methane (or natural gas) to synthesis gas in high yields could be prepared by the process described in this invention. Another important finding of the present invention is that, using the novel composite catalysts prepared by the process of the present invention, the oxidative conversion of methane (or natural gas) to synthesis gas in very high yields could be carried out at much lower temperatures and much higher gas hourly space velocities (or much lower contact times). One more finding is that the above mentioned catalysts described in the present invention could be used with or without reduction, for the oxidative conversion of methane (or natural gas) to synthesis gas; the reduced catalysts, however, could be operated in the said process at much lower temperatures. Whereas, the unreduced catalysts are first to be operated in the process at higher temperature and then could be used in the process at lower temperatures. The catalyst in its active form is essentially a reduced and/or partially reduced transitional metal oxide dispersed on the alkaline earth metal oxide.

Accordingly, the present invention provides a process for the preparation of novel composite catalysts containing transitional and alkaline earth metal oxides, represented by the formula: $T_mA\ O_n$ wherein T is transitional element selected form Ni, Co, Pd, Ru, Rh, Ir or like or a mixture of two or more thereof, m (i.e T/A mole ratio) is from about 0.01 to about 100, A is alkaline earth element chosen from Mg, Ca, Ba, Sr or like or a mixture of two or more thereof, O is oxygen, and n is number of oxygen atoms needed to fulfil the valence requirements of the transitional and alkaline earth elements in the catalyst,useful for oxidative conversion of methane (or natural gas) to $H_2$ and CO (or synthesis gas) in presence of free $O_2$, which comprises the following steps: (i) Mixing thoroughly finely ground one or more transitional metal compound represented by the formula $T\ X_a$ wherein, T is transitional element selected from Ni, Co, Pd, Ru, Rh, Ir or like or a mixture of two or more thereof; X is selected from $NO_3$, $CH_3COO$, OH, O, $CO_3$, Cl or like and a is number of X required to fulfil the valence requirement of the transitional element in the compound, and one or more finely ground alkaline earth metal compound, represented by the formula: A $Y_b$ wherein A is alkaline earth element selected from Mg,Ca,Ba,Sr or like or a mixture of two or more thereof, which are catalyst precursors, Y is selected from $NO_3$, OH, O, $CO_3$, $CH_3(COO)$ or like, and b is number of Y required to fulfil the valence requirement of the alkaline earth element, which are catalyst precursors, with the T/A mole ratio of about 0.01 to 100, with water, just sufficient to make a thick paste, or without water, (ii) heating the mixture of catalyst precursors to dryness at a temperature or about 80°–250° C. in air, (iii) decomposing the dried mass containing catalyst precursors to their oxides at a temperature of about 400°–1200° C. in presence of air or inert gas (viz. $N_2$, He, Ar or like) or under vacuum for about 0.5–50 h, (iv) powdering the decomposed mass and making by known methods catalyst pellets, extrudes or granules of required size, and (v) calcining the catalyst at a temperature of about 400°–1500° C. in presence of air, inert gas (viz. $N_2$, Ne, Ar or like ),$CO_2$, or their mixture or under vacuum for about 1–100 h.

The preferred transitional element (i.e. T) in the catalyst or in the mixture of catalyst precursors is Ni, Co or like or their mixture. The preferred alkaline earth element (i.e. A) in the catalyst or in the mixture of catalyst precursors is Mg, Ca, or like or mixture of two or more thereof. The preferred T/A mole ratio in the catalyst or in the mixture of catalyst precursors is in the range of 0.1–10. The preferred temperature for the decomposition of the catalyst precursors is in the range of 500°–1000° C. The preferred period of decomposition of catalyst precursors is 1–20 h. The preferred temperature for calcination of catalyst is in the range of 500°–1000° C. The preferred period of calcination of catalyst is 1–20 h. The preferred gas atmosphere for the decomposition of catalyst precursors or catalyst calcination is air or inert gas.

The product obtained from the process of the invention is a novel composite catalyst containing transitional and alkaline earth oxides, useful for oxidative conversion of methane (or natural gas) to CO and $H_2$ or synthesis gas.

The present invention reveals that novel composite catalysts containing transitional and alkaline earth oxides, showing very high methane conversion activity, very high selectivity for CO and $H_2$ formation, and very high productivity for CO and $H_2$ and long catalyst life in the oxidative conversion of methane (or natural gas) to CO and $H_2$ (or synthesis gas), operating at extremely high space velocities and at both lower (even at 300° C.) and higher temperatures, can be prepared by the catalyst preparation process described in the invention.

Using the composite catalyst prepared by the process of the present invention for oxidative conversion of methane (or natural gas) in presence of free oxygen (i.e. gaseous oxygen), methane can be converted at 250°–900° C. to CO and $H_2$ (or synthesis gas) at a very high conversion (60–100%) with very high selectivity (80–100%) and productivity (for CO, 8–13 mol.$g^{-1}$. $h^{-1}$ and for $H_2$ 10–26 mol. $g^{-1}h^{-1}$) giving a $H_2$/CO mol ratio in the products about 2.0±0.3 without loss of catalytic activity/selectivity for a long period. For examples, NiO—CaO catalyst (with Ni/Ca mole ratio=3.0) gave 70% conversion of methane with above 90% selectivity for CO and $H_2$ ($H_2$/CO mole ratio= 2.0) and productivity of about 10 and 20 moles per gram catalyst per hour for CO and $H_2$, respectively, in the oxidative conversion of methane to synthesis gas at 550° C. and gas hourly space velocity of 516,000 $cm^3.g^{-1}.h^{-1}$.

DETAILED DESCRIPTION

The present invention is described with respect to the following examples. These are provided for illustrative purpose only and are not to be construed as limitation on the invention.

Definition Of Terms Used In The Examples

Total conversion of methane (%) =

Mole % of methane converted to all the products

Conversion of methane to a particular product (%)

or yield for a particular product = mole % of methane converted to the particular product.

Selectivity for a particular product (%) =

$$\left[ \frac{\text{Conversion of methane to the product (\%)}}{\text{Total conversion of methane (\%)}} \right] \times 100.$$

Productivity (or space-time-yield) for a particular product is the amount of the product formed in the process per unit weight of catalyst per unit time.

Gas hourly space velocity (GHSV) is the volume of gaseous reactant mixture (measured at STP) passed over a unit weight of catalyst per hour.

In the conversion of natural gas, the selectivity and conversion data are based on the carbon balance.

EXAMPLE 1

In this example, preparation of NiO—CaO catalyst (with Ni/Ca mole ratio of 3.0) is illustrated.

Finely ground 3.7 g of $Ca(OH)_2$, finely ground 43.6 g of $Ni(NO_3)_2.6H_2O$ and 1.0 ml of deionized water are thoroughly mixed and the resulting thick paste is dried in air oven at 120° C. for 15 h. The dried mass is decomposed at 600° C. in air for 4 h. The decomposed mass is then powdered, pressed binder-free at 4 ton pressure and crushed to 20–30 mesh size particles. The catalyst particles are then calcined in air at 930° C. for 4 h to provide the desired NiO—CaO catalyst. The color of the catalyst was black. The surface area of the catalyst was 2.46 $m^2.g^{-1}$.

EXAMPLE 2

This example illustrates the use or performance of the NiO—CaO catalyst, the preparation of which is described in Example- 1, for the oxidative conversion of methane to synthesis gas.

The oxidative conversion of methane to CO and $H_2$ (i.e. synthesis gas) over the catalyst was carried out in a flow quartz reactor (i.d=5 mm) packed with the catalyst particles (20 mg) using a mixture of pure methane and oxygen as a feed. The reactor temperature was measured by Chromel Alumel thermocouple located in the catalyst bed. The reactor effluent gases were cooled at about 0 C. to condense the water formed in then reaction using coiled condenser immersed in ice-water slurry and then analysed for CO, $CO_2$, $H_2$ and unconverted methane and $O_2$ by an on-line gas chromatograph using a Spherocarb column. The change in the volumetric flow rate of gases due to the reaction ($CH_4 + \frac{1}{2}O_2 \rightleftharpoons CO+2H_2$) was determined by measuring the flow rate of feed and product gases (after removing water) using soap bubble flow-meter. Before carrying out the reaction, the catalyst was pretreated insitu at the calcination temperature of the catalyst in a flow of pure $N_2$ (50.0 ml $min^{-1}$) for 1 h.

The catalyst performance was evaluated at the following process conditions.

Feed composition: 67 mol % methane and 33 mol % $O_2$

Space velocity: 516.000 $cm^3.g^{-1}.h^{-1}$

Pressure: 1.08 atm.

Reaction temperature: 345°–853° C.

The results obtained at different reaction temperatures are as follows.

|  | Reaction temperature (°C.) | | | | | |
|---|---|---|---|---|---|---|
|  | 853° | 750° | 650° | 550° | 448° | 345° |
| Total $CH_4$ conversion (%) | 85.9 | 80.2 | 75.5 | 70.1 | 64.7 | 58.2 |
| Selectivity for CO (%) | 96.8 | 95.4 | 91.4 | 90.1 | 85.6 | 81.0 |
| Selectivity for $H_2$ (%) | 97.4 | 97.4 | 94.1 | 92.0 | 90.0 | 80.9 |
| Productivity for CO (mol. $g^{-1} h^{-1}$) | 12.9 | 11.8 | 10.7 | 9.8 | 8.6 | 7.8 |
| Productivity for $H_2$ (mol. $g^{-1} h^{-1}$) | 25.8 | 24.1 | 21.0 | 19.9 | 17.9 | 14.6 |
| $H_2$/CO mole ratio in the product | 2.01 | 2.04 | 2.00 | 2.04 | 2.10 | 2.00 |

EXAMPLE 3

This example illustrates the stability of the NiO—CaO catalyst the preparation of which is described in Example 1, in the oxidative conversion of methane to synthesis gas.

The reaction over the catalyst was carried out in the reactor and by the procedure similar to that described in Example 2, at the following process conditions.

Feed composition: 67 mol % $CH_4$ and 33 mol % $O_2$

Gas hourly space velocity: 516.000 $cm^3.g^{-1}.h^{-1}$ (GHSV)

Pressure: 1.09 atm.

Reaction temperature:550° ±3° C.

The results showing the time-on-stream activity/selectivity of the catalyst in the process are given below.

|  | Time - on - stream (h) | | | | | |
|---|---|---|---|---|---|---|
|  | 0.5 | 4.0 | 6.0 | 8.0 | 10.0 | 12.0 |
| Total $CH_4$ conversion (%) | 70.1 | 69.7 | 68.9 | 71.1 | 69.4 | 70.2 |
| Selectivity for CO (%) | 90.2 | 90.5 | 90.6 | 90.2 | 90.2 | 90.6 |
| Selectivity for $H_2$ (%) | 91.3 | 92.1 | 92.5 | 91.9 | 89.7 | 90.5 |
| $H_2$/CO mole ratio in products | 2.02 | 2.04 | 2.04 | 2.04 | 1.95 | 2.00 |

EXAMPLE 4

This example illustrates the performance or use of the NiO—CaO catalyst, the preparation of which is described in Example 1, after its reduction by $H_2$, in the oxidative conversion of methane to synthesis gas.

The reduction over the catalyst was carried out in the reactor and by the procedure similar to that described in Example 2 except that the catalyst pretreated insitu was reduced in the flow (60 $cm^3.min^{-1}$) of a mixture of $H_2$ and $N_2$ (18 % $H_2$) at 400° C. for a period of 1 h, before carrying out the catalytic reaction. The reaction was carried out at the following conditions.

Feed composition: 67 mol % $CH_4$ and 33 mol % $O_2$

Gas hourly space velocity: 515.000 $cm^3.g^{-1}.h^{-1}$ (GHSV)

Pressure: 1.08 atm.

Reaction temperature: 347°, 402° and 501° C.

The results obtained are given below.

|  | Reaction temperature (°C.) | | |
|---|---|---|---|
|  | 347° | 402° | 501° |
| Total $CH_4$ conversion (%) | 60.2 | 62.3 | 70.0 |
| Selectivity for CO (%) | 78.4 | 81.6 | 87.2 |
| Selectivity for $H_2$ (%) | 84.7 | 82.4 | 84.1 |
| $H_2$/CO mole ratio in product | 2.16 | 2.02 | 1.03 |

When the catalyst was not reduced, the reaction on the catalyst did not occur at or below 550° C.

EXAMPLE 5

This example illustrates the performance of NiO—CaO catalyst (with Ni/Ca mole ratio=3.0 ), prepared by the procedure similar to that described in Example 1 except the fact that the catalyst calcination temperature was 600° C. and 750° C., in the oxidative conversion of methane to synthesis gas.

The reaction over the catalysts was carried out in the reactor and by the procedure similar to that described in Example 352, at the following conditions.

Feed composition: 66 mol % $CH_4$ and 34 mol % $O_2$

GHSV: 516,000 cm$^3$. g$^{-1}$. h$^{-1}$

Pressure: 1.09 atm.

Reaction temperature: 448° C.

The results obtained using the catalyst calcined at 600° C. and 750° C. are as follows.

|  | Calcination temperature (°C.) | |
|---|---|---|
|  | 600° | 750° |
| Total $CH_4$ conversion (%) | 59.0 | 62.4 |
| Selectivity for CO (%) | 82.4 | 83.8 |
| Selectivity for $H_2$ (%) | 85.0 | 85.6 |
| $H_2$/CO mole ratio | 2.06 | 2.04 |

EXAMPLE 6

This example illustrates the performance or use of the NiO—CaO catalyst, the preparation of which is described in Example 1, in oxidative conversion of natural gas into synthesis gas.

The reaction over the catalyst was carried out in the reactor and by the procedure similar to that described in Example 4 except that instead of methane, natural gas (comprising methane, ethane and $C_3$- and $C_4$-alkanes) is used in the feed, and the catalyst was reduced by $H_2$ (20% $H_2$ in $N_2$) at 500° C. for 1.5 h, at the following process conditions.

Feed composition: 59.6 mol % $CH_4$, 6.0 mol % $C_2H_6$, 1.4 mol % $C_3$- and $C_4$-alkanes , 32 mol % $O_2$, 0.3 mol % $CO_2$ and 0.7 mol % $N_2$ GHSV: 515,000 cm$^3$. g$^{-1}$. h$^{-1}$ Pressure: 1.08 atm.

Reaction temperature: 404°, 654° and 851° C.

The results obtained at different temperatures are as follows.

|  | Reaction temperature (°C.) | | |
|---|---|---|---|
|  | 404° | 654° | 851° |
| Total carbon conversion (%) | 50.7 | 63.7 | 78.8 |
| Selectivity for CO (%) | 86.2 | 93.2 | 98.0 |
| Selectivity for $H_2$ (%) | 84.5 | 91.6 | 93.6 |
| $H_2$/CO mole ratio | 1.96 | 1.97 | 1.91 |

EXAMPLE 7

This example illustrate the preparation of NiO—CaO catalyst with Ni/Ca mole ratio of 0.1.

Finely ground 18.53 g of Ca(OH)$_2$, finely ground 7.3 g of Ni(NO$_3$)$_2$. 6 H$_2$O and 24 ml of deionized water are thoroughly mixed and the resulting paste is dried in air oven at 150 C. for 10 h. The dried mass is decomposed at 550° C. in air for 15 h. The decomposed solid is then powdered, pressed binder-free at 5 ton pressure and crushed to 22–30 mesh size particles. The catalyst particles are then calcined at 950° C. in presence of nitrogen for 2 h to provide the desired NiO—CaO catalyst. The colour of the catalyst was gyay. The surface area of the catalyst was 1.34 m$^2$. g$^{-1}$.

EXAMPLE 8

This example illustrate the use of the NiO—CaO catalyst, the preparation of which is described in Example - 7, for the oxidative conversion of methane to synthesis gas. The reaction over the catalyst was carried out in the reactor and by the procedure similar to that described in Example 2, at the following reaction conditions.

Feed composition: 67 mol % $CH_4$ and 33 mol % $O_2$

GHSV: 517,000 cm$^3$. g$^{-1}$. h$^{-1}$

Pressure: 1.06 atm.

Reaction temperature: 648°, 751° and 849° C.

The results obtained at the different reaction temperatures are as follows.

|  | Reaction temperature (°C.) | | |
|---|---|---|---|
|  | 648° | 751° | 849° |
| Total $CH_4$ conversion (%) | 63.8 | 66.8 | 78.5 |
| Selectivity for CO (%) | 83.1 | 90.7 | 94.7 |
| Selectivity for $H_2$ (%) | 84.4 | 90.0 | 94.1 |
| $H_2$/CO mole ratio | 2.02 | 1.98 | 1.99 |

EXAMPLE 9

This example illustrates the preparation of NiO—CaO catalyst with Ni/Ca mole ratio of 10.0.

Finely ground 1.86 g of Ca(OH)$_2$ and finely ground 72.7 g of Ni(NO$_3$)$_2$. 6H$_2$O are thoroughly mixed and resulting mixture is heated in air oven at 100° C. for 2 h and then decomposed at 610° C. in air for 4 h. The decomposed solid mass is then powdered, pressed binder—free at 5 ton pressure and crushed to 22–30 mesh size particles. The catalyst particles are then calcined at 925° C. in presence of air for 4 h to provide the desired NiO—CaO catalyst. The color of the catalyst was black. The surface area of the catalyst was 1.64 m$^2$.g$^{-1}$.

EXAMPLE 10

This example illustrates the use of the NiO—CaO catalyst, the preparation of which is described in Example 9.

for the oxidative conversion of methane to synthesis gas. The reaction over the catalyst was carried out in the reactor and by the procedure similar to that described in Example 2, at the following reaction conditions.

Feed composition: 67 mol % $CH_4$ and 34 mol % $O_2$

GHSV: 516,000 $cm^3 \cdot g^{-1} \cdot h^{-1}$

Reaction temperature: 450°,552°,648° and 752° C.

Results at different reaction temperatures are as follows.

|  | Reaction temperature (°C.) | | | |
| --- | --- | --- | --- | --- |
|  | 752° | 648° | 552° | 445° |
| Total $CH_4$ conversion (%) | 78.8 | 75.4 | 57.9 | 51.0 |
| Selectivity for CO (%) | 94.1 | 92.8 | 84.2 | 77.9 |
| Selectivity for $H_2$ (%) | 90.7 | 90.2 | 78.9 | 76.8 |
| $H_2$/CO mole ratio | 1.93 | 1.94 | 1.87 | 1.97 |

EXAMPLE 11

This example illustrates the preparation of NiO—CaO catalyst with Ni/Ca mole ratio of 0.5.

Finely ground 18.52 g of $Ca(OH)_2$, finely ground 36.4 g of nickel nitrate hexahydrate and 30 ml of deionized water are thoroughly mixed and the resulting paste is dried in air oven at 130° C. for 8 h. The dried mass is then decomposed at 605° C. in air for 5 h. The decomposed solid mass is then powdered, pressed binder-free at 4 ton pressure and crushed to particles of 22–30 mesh. The catalyst particles are then calcined in air at 930° C. for 4 h to provide the desired NiO—CaO catalyst. The colour of the catalyst was gray. The surface area of the catalyst was 0.97 $m^2 \cdot g^{-1}$.

EXAMPLE 12

This example illustrates the preparation of NiO—CaO catalyst with Ni/Ca mole ratio of 0.5, using different precursor for CaO. The cataystis prepared by the procedure similar to that described in Example - 11 except that instead of calcium hydroxide, 0.25 moles of Ca $(NO_3)_2 \cdot 4\ H_2O$ is used in the catalyst preparation. The color of the catalyst was black. The surface area of the catalyst was 0.73 $m^2 \cdot g^{-1}$.

EXAMPLE 13

This example illustrates the preparation of NiO—CaO catalyst with Ni/Ca mole ratio of 0.5, using different precursor for CaO. The catalyst is prepared by the procedure similar to that described in Example 11 except that instead of calcium hydroxide, 0.25 moles of CaO is used in the catalyst preparation. The color of the catalyst was black. The surface area of the catalyst was 2.69 $m^2 \cdot g^{-1}$.

EXAMPLE 14

This example illustrates the performance of the NiO—CaO catalysts (with Ni/Ca mole ratio=0.5), the preparation of which is described in Example 11–13, in the oxidative conversion of methane to synthesis gas. The reaction over the catalysts was carried out in the reactor and by the procedure described in the Example - 2, at the following reaction conditions.

Feed composition 66 mol % $CH_4$ and 34 mol % $O_2$

GHSV: 516,000 $cm^3 \cdot g^{-1} \cdot h^{-1}$

Pressure: 1.08 atm.

Reaction temperature: 650° C.

| | Catalyst prepared in Examples 11–13 | | |
| --- | --- | --- | --- |
| | Example-11 | Example-12 | Example-13 |
| Total $CH_4$ conversion (%) | 70.5 | 73.6 | 79.2 |
| Selectivity for CO (%) | 90.4 | 90.9 | 90.5 |
| Selectivity for $H_2$ (%) | 90.7 | 94.1 | 91.4 |
| $H_2$/CO mole ratio | 2.01 | 2.07 | 2.02 |

EXAMPLE 15

This example illustrates the preparation of NiO—MgO catalyast with Ni/Mg mole ratio of 1.0.

Finely ground 29.8 g of $Ni(NO_3)_2 \cdot 6\ H_2O$, finely ground 9.4 g of magnesium carbonate and 15 ml of deionized water are thoroughly mixed and the resulting thick paste is dried in air oven at 120° C. for 6 h. The dried mass is decomposed in air at 590 C. for 4 h. The decomposed mass is then powdered, pressed binder-free at 5 ton pressure and crushed to 22–30 mesh size particles. The catalysts particles are then calcined in air at 910° C. for 5 h to provide the desired NiO—MgO catalyst. The color of the catalyst was gray. The surface area of the catalyst was 5.31 $m^2 \cdot g^{-1}$.

EXAMPLE 16

This example illustrates the use of the NiO—MgO catalyst, the preparation of which is described in Example 15, for the oxidative conversion of methane to synthesis gas. The reaction over the catalyst was carried out in the reactor and by the procedure similar to that described in Example 2, at the following reaction conditions.

Feed composition: 67 mol % $CH_4$ and 33 mol % $O_2$

GHSV: 516,000 $cm^2 \cdot g^{-1} \cdot h^{-1}$

Pressure: 1.03 stm.

Reaction temperature: 245°, 300°, 430°, 658° and 745° C.

The results at different reaction temperatures are as follows.

|  | Reaction temperature (°C.) | | | | |
| --- | --- | --- | --- | --- | --- |
|  | 754° | 658° | 430° | 300° | 245° |
| Total $CH_4$ conversion (%) | 90.1 | 78.1 | 69.1 | 66.8 | 60.8 |
| Selectivity for CO (%) | 89.0 | 91.7 | 86.4 | 82.4 | 78.5 |
| Selectivity for $H_2$ (%) | 86.5 | 99.2 | 94.4 | 89.2 | 89.7 |
| $H_2$/CO mole ratio | 1.94 | 2.16 | 2.19 | 2.17 | 2.29 |

EXAMPLE 17

This example illustrates the preparation of NiO—MgO catalyst with Ni/Mg mole ratio of 3.0.

Finely ground 34.9 g of $Ni(NO_3)_2 \cdot 6H_2O$, finely ground 3.7 g of magnesium carbonate and 12 ml of deionized water are thoroughly mixed and the resulting paste is dried in air oven at 125° C. for 5h. The dried mass is then decomposed in air at 610 C. for 5h. The decomposed mass is then powdered, pressed binder-free at 4 ton pressure and crushed to 22–30 mesh size particles. The catalyst particles are then calcined in presence of air at 905° C. for 6h. to provide the desired NiO—MgO catalysts. The color of the catalyst was gray. The surface area of the catalyst was 3.31 $m^2 g^{-1}$.

EXAMPLE 18

This example illustrates the use of NiO—Mgo catalyst, the preparation of which is described in example 17, for the oxidative conversion of methane to synthesis gas. The reaction over the catalyst was carried out in the reactor and by the procedure similar to that described in Example 2, at the following reaction conditions.

Feed composition: 66 mol % $CH_4$ and 34 mol % $O_2$
GHSV: 516,000 $cm^3$. $g^{-1}.h^{-1}$
Pressure: 1.05 atm.
Reaction temperature: 590° C., 652° C., 750° C. and 851° C.

The results at different reaction temperatures are as follows.

|  | Reaction temperature (°C.) | | | |
| --- | --- | --- | --- | --- |
|  | 851° | 750° | 652° | 590° |
| Total $CH_4$ conversion (%) | 95.9 | 90.9 | 86.0 | 80.4 |
| Selectivity for CO (%) | 100 | 100 | 100 | 100 |
| Selectivity for $H_2$ (%) | 90.1 | 92.9 | 93.2 | 91.7 |
| $H_2$/CO mole ratio | 1.80 | 1.86 | 1.86 | 1.84 |

EXAMPLE 19

This example illustrates the preparation of CoO—MgO—BaO catalyst [with Co/(Mg+Ba) mole ratio=Mg/Ba mole ratio=1.o]

Finely ground 23.2 g of $Ni(NO_3)_2$ .$6H_2O$, finely ground 12.62 g or $Ba(OH)_2 8H_2O$, finely ground 3.7 g of magnesium carbonate and 15 ml of deionized water are thoroughly mixed and the resulting mixture is dried in air oven at 122° C. for 6 h. The dried mass is then decomposed at 595 C. in air for 10 h. Decomposed mass is then powered pressed binder-free at 5 ton pressure and crushed to 22–30 mesh size particles. The catalyst particles are then calcined in presence of air at 910° C. for 5 h to provide the desired CoO—MgO—BaO catalyst. The colour of the catalyst was light brown. The surface area of the catalyst was 3.55 $m^2g^{-1}$.

EXAMPLE 20

This example illustrates the use of CoO—MgO—BaO catalyst, the preparation of which is described in Example 19, for the oxidative conversion of methane to synthesis gas. The reaction over the catalyst was carried out in the reactor and by the procedure similar to that described in Example 2 at the following reaction conditions.

Feed composition: 66 mol % $CH_4$ and 34 mol % $O_a$
GHSV: 516,000 $cm^3$. $g^{-1}$. $h^{-1}$
Pressure: 1.08 atm.
Reaction temperature: 365°, 454°, 651°, 751° and 855° C.

The results at different reaction temperatures are as follows.

|  | Reaction temperature (°C.) | | | | |
| --- | --- | --- | --- | --- | --- |
|  | 855° | 751° | 651° | 454° | 365° |
| Total $CH_4$ conversion (%) | 100.0 | 92.9 | 89.9 | 82.2 | 76.1 |
| Selectivity for CO (%) | 100.0 | 87.7 | 85.7 | 79.0 | 73.9 |

-continued

|  | Reaction temperature (°C.) | | | | |
| --- | --- | --- | --- | --- | --- |
|  | 855° | 751° | 651° | 454° | 365° |
| Selectivity for $H_2$ (%) | 93.3 | 88.1 | 85.9 | 80.0 | 80.8 |
| $H_2$/CO mole ratio | 1.87 | 2.01 | 2.01 | 2.02 | 2.19 |

EXAMPLE 21

This example illustrates the preparation of Co—MgO catalyst with Co/Mg mole ratio of 1.0.

Finely ground 37.5 g $(CH_3COO)_2$ Co . $4H_2O$, finely ground 32.2 g $(CH_3COO)_2Mg$. 4 $H_2O$ and 20 ml deionized water are thoroughly mixed and the resulting paste is dried in air oven at 120° C. for 5 h. The dried mass is then decomposed at 705 C. in air for 8 h. Decomposed mass is then powdered, pressed binder-free at 5 ton pressure and crushed to 22–30 mesh size particles. The catalyst particles are then calcined in air at 900° C. for 6 h to provide the desired CoO—Mgo catalyst. The color of the catalyst was pinkish black. The surface area of the catalyst was 0.46 $m^2$. $g^{-1}$.

EXAMPLE 22

This example illustrates the use of CoO—MgO catalyst, the preparation of which is described in Example 21, for the oxidative conversion of methane to synthesis gas. The reaction over the catalyst was carried out in the reactor and by the procedure similar to that described in Example 2, at the following conditions.

Feed composition: 66 mol % $CH_4$ and 34 mol % $O_2$
GHSV: 516,000 $cm^3$. $g^{-1}$. $h^{-1}$
Pressure: 1.03 atm.
Reaction temperature: 512°, 602° and 658° C.

The results at different reaction temperatures are as follows.

|  | Reaction temperature (°C.) | | |
| --- | --- | --- | --- |
|  | 658° | 602° | 512° |
| Total $CH_4$ conversion (%) | 54.7 | 48.1 | 54.7 |
| Selectivity for CO (%) | 86.5 | 84.5 | 86.5 |
| Selectivity for $H_2$ (%) | 97.9 | 100.0 | 97.9 |
| $H_2$/CO mole ratio | 2.26 | 2.37 | 2.26 |

In our co-pending application Ser. No. 07/943,181, now U.S. Pat. No. 5,338,488, we have described and claimed a process for the oxidative conversion of methane or natural gas to CO and $H_2$ (synthesis gas) using the novel catalyst prepared by the process of the present invention.

The main advantages of the invention are (i) The novel catalysts prepared by the process of present invention have very high methane (or natural gas) conversion activity with very high selectivity and productivity for CO and $H_2$(or synthesis gas) in the oxidative conversion of methane (or natural gas) to synthesis gas which is mildly exhothermic and hence, is not energy intensive. After start of the catalytic reaction, there is no need to provide energy for the reaction as heat is generated during the reaction.

(ii) Since the catalyst precursor i.e., alkaline earth metal compounds and transitional metal, particularly nickel and cobalt compound, used in the catalyst preparation process are cheaper, the catalyst production cost is much lower.

(iii) By using the catalyst of present invention, the oxidative conversion of methane (or natural gas) to synthesis gas could be carried out at much lower temperature than that used in the different processes known in the prior art.

(iv) The catalyst of the present invention show high activity/selectivity at extremely high space velocities (i.e at very low contact times) and hence have very high productivity for CO and $H_2$ in the oxidative conversion of methane (or natural gas) to synthesis gas.

(v) The catalyst of present invention could be used in the oxidative conversion of methane (or natural gas) to synthesis gas without the loss of catalytic activity/selectivity for a long period, showing long catalyst life in the process.

(vi) There is no carbon deposition on the catalyst in the oxidative conversion of methane (or natural gas) to synthesis gas.

We claim:

1. A process for preparation of a novel composite catalyst useful for oxidative conversion of methane or natural gas to $H_2$ and CO or synthesis gas, said composite catalyst consisting of transitional and alkaline earth metal oxides and having the formula: $T_mAO_n$; wherein T is a transitional element selected from the group consisting of Ni, Co, Pd, Ru, Rh, Ir and mixtures thereof, wherein m is a mole ratio equal to t/A, said mole ratio being about 0.01 to about 10; wherein A is an alkaline earth element selected from the group consisting of Mg, Ca, Ba, Sr and mixtures thereof; wherein O is oxygen and n is a number of oxygen atoms needed to complete the valence requirement of the transitional and alkaline earth elements in the catalyst; said process consisting essentially of i) mixing thoroughly, without water or with addition of an amount of water just sufficient to make a thick paste, catalyst precursors consisting essentially of:

a) one or more finely ground transitional metal compounds represented by the formula $TX_a$; wherein T is the transitional element; wherein X is selected from the group consisting of $NO_3$, $CH_3COO$, OH, $CO_3$ and Cl; and wherein a is a number of X required to complete the valence requirement of the transitional element; and b) one or more finely ground alkaline earth metal compounds represented by the formula: $AY_b$; wherein A is the alkaline earth element; wherein Y is selected from the group consisting of $NO_3$, OH, $CO_3$, and $CH_3COO$; and wherein b is a number of Y required to complete the valence requirement of the alkaline earth element; said catalyst precursors having a T/A mole ratio of about 0.01 to about 10;

ii) if the mixing in step i) is performed with the addition of water, heating the mixture of catalyst precursors to dryness at a temperature of about 80° to 250° C. in air or under vacuum to form a dried mass;

iii) decomposing the mixture of catalyst precursors of step i) or the dried mass containing catalyst precursors of step ii) to their oxides at a temperature of between about 500° to 1,200° C. in the presence of air or inert gas or under vacuum for a time sufficient to form a decomposed mass, said decomposing being in the presence of air if X is Cl;

iv) powdering the decomposed mass and forming the powdered decomposed mass under pressure; and v) calcining the catalyst in the presence of air, inert gas, CO or their mixture or under vacuum at a calcination temperature and for a calcination time sufficient to render the catalyst effective in catalyzing a conversion of methane in a reactant mixture comprising about 67 mol % methane and 33 mol % $O_2$ passing over the catalyst at a gas hourly space velocity of about 516.000 $cm^3.g^{-1}.h^{-1}$ and at a reaction temperature of about 445° C. to synthesis gas with at least a 51.0% conversion of the methane and with a selectivity for CO and $H_2$ of at least about 77.9% and 76.8% respectively, said calcination temperature being at least about 600° C.

2. A process as claimed in claim 1 wherein the transitional element, T, is Ni or Co or their mixture.

3. A process as claimed in claim 1 wherein the alkaline earth element, A, is Mg, Ca, or a mixture thereof.

4. A process as claimed in claim 1 wherein the T/A mole ratio in the catalyst or mixture of catalyst precursors ranges from 0.1 to 10.

5. A process as claimed in claim 1 wherein the decomposition temperature ranges from 500° to 1000° C.

6. A process as claimed in claim 1 wherein the period of decomposition ranges from 2 to 20 h.

7. A process as claimed in claim 1 wherein the gas atmosphere for the decomposition is air or inert gas.

8. A process as claimed in claim 1 wherein the catalyst calcination temperature ranges from 500° to 1000° C.

9. A process as claimed in claim 1 wherein the period of catalyst calcination ranges from 1 to 20 h.

10. A process as claimed in claim 1 wherein the gas atmosphere for the catalyst calcination is air or inert gas.

11. A process as claimed in claim 1 wherein the powdered decomposed mass is formed in step iv by pressing without a binder and crushing into particles.

12. A process as claimed in claim 1 wherein the T/A mole ratio in the catalyst or mixture of catalyst precursors ranges from 0.1 to 10.

13. A process as claimed in claim 1 further comprising reducing the catalyst with $H_2$.

* * * * *